United States Patent

Suhara et al.

[11] Patent Number: 6,065,876
[45] Date of Patent: May 23, 2000

[54] EQUIPMENT FOR USE IN MOLTEN METAL PLATING BATH

[75] Inventors: Michinori Suhara, Tokyo; Yasunari Sato, Tokai; Toshinori Yashiro, Nagoya, all of Japan

[73] Assignees: Nippon Steel Hardfacing Co., Ltd.; Nippon Steel Corporation; Hitachi Metals, Ltd., all of Tokyo, Japan

[21] Appl. No.: 09/029,517

[22] PCT Filed: Jul. 8, 1997

[86] PCT No.: PCT/JP97/02364

§ 371 Date: May 19, 1998

§ 102(e) Date: May 19, 1998

[87] PCT Pub. No.: WO98/01594

PCT Pub. Date: Jan. 15, 1998

[30] Foreign Application Priority Data

Jul. 8, 1996 [JP] Japan ................................ 8-195200

[51] Int. Cl.⁷ ........................................ F16C 17/02
[52] U.S. Cl. ................................ 384/129; 384/913
[58] Field of Search ............................ 384/492, 913, 384/907.1, 129, 548

[56] References Cited

U.S. PATENT DOCUMENTS 4,634,300   1/1987   Takebayashi et al. .................. 384/548

FOREIGN PATENT DOCUMENTS

| 59-182276 | 10/1984 | Japan . |
| 61-37955 | 2/1986 | Japan . |
| 1-159359 | 6/1989 | Japan . |
| 6-322457 | 11/1994 | Japan . |

*Primary Examiner*—Lenard A. Footland
*Attorney, Agent, or Firm*—Kanesaka & Takeuchi

[57] ABSTRACT

An equipment for use in a molten metal plating bath, comprising a bearing disposed in the molten metal plating bath for supporting a roller with an end, the bearing containing 70–95 wt. % of $Si_3N_4$, 2–10 wt. % of $Al_2O_3$, 1–10 wt. % of AlN and 1–10 wt. % of $Y_2O_3$ and having a concave with a rectangular shape in section, the end of the roller being directly disposed in the concave to be supported by the bearing without using rollers.

4 Claims, 2 Drawing Sheets

6,065,876

EQUIPMENT FOR USE IN MOLTEN METAL PLATING BATH

TECHNICAL FIELD

The present invention relates to various types of equipments for use in baths employed in plating of non-ferrous metals other than copper, such as, for example, molten zinc plating, molten aluminum plating, or plating of molten zinc-aluminum alloys; in particular, the present invention relates to various types of equipments used in baths which are disposed within molten metal plating baths having a composition such that silicon nitride ($Si_3N_4$) is the main component thereof (for example, bath rollers [support rollers, synch rollers, and the like], roller bearings, roller arms, melting boxes, snouts, pumps within baths, thrust locks, and the like).

BACKGROUND ART

Conventionally, materials resistant to melting and metal corrosion such as low carbon steel, high chromium steel, and SUS316L, and the like, were commonly employed for various types of equipments used in baths employed in molten zinc plating, molten aluminum plating, or the plating of molten zinc-aluminum alloy.

In a case of requiring greater resistance to corrosion than that offered by these materials resistant to melting and metal corrosion, it is common to build up metal by welding or to form a film by flame spraying on the surfaces of these metal implements and equipments using one or a mixture of two or more of oxides, borides, nitrides, carbides, fluorides, and the like of various corrosion resistant metals such as W, Co, Mo, and Cr and the like. In this case, the service life during which such implements or equipments could be continuously employed without causing defects in the high grade products was within a range of 15–90 days.

In order to improve the productivity of the manufacturing industry, it is necessary to operate facilities over a long period of time without affecting the quality of the materials produced.

In order to respond to this need in molten metal plating operations, it is necessary that the service life, during which the implements and equipment used within the plating bath can be continuously employed, be as long as possible, in addition to management of the plating baths.

The present invention solves the problems in the conventional technology described above; it is an object thereof to provide various types of equipments for use in molten metal plating baths which are capable of stable use over a long period of six months or more.

DISCLOSURE OF THE INVENTION

In order to attain the above object, the present inventors have conducted diligent research, and as a result discovered that it is effective to form various equipments for use in molten metal plating baths using a composition having as a main component thereof silicon nitride, which is a material which does not react with the molten metal and which is easily worked; the present invention was completed based on this discovery.

The invention based on this discovery comprises equipments used in baths, such as rollers, bearings, roller arms, melting boxes, snouts, pumps, thrust locks, and the like, which are disposed within molten metal plating baths, and which is formed by a composition containing $Si_3N_4$: 70–95%, $Al_2O_3$: 2–10%, AlN: 1–10%, $Y_2O_3$: 1–10%, and unavoidable impurities.

BRIEF DESCRIPTION OF THE DIAGRAMS

Figure 1:
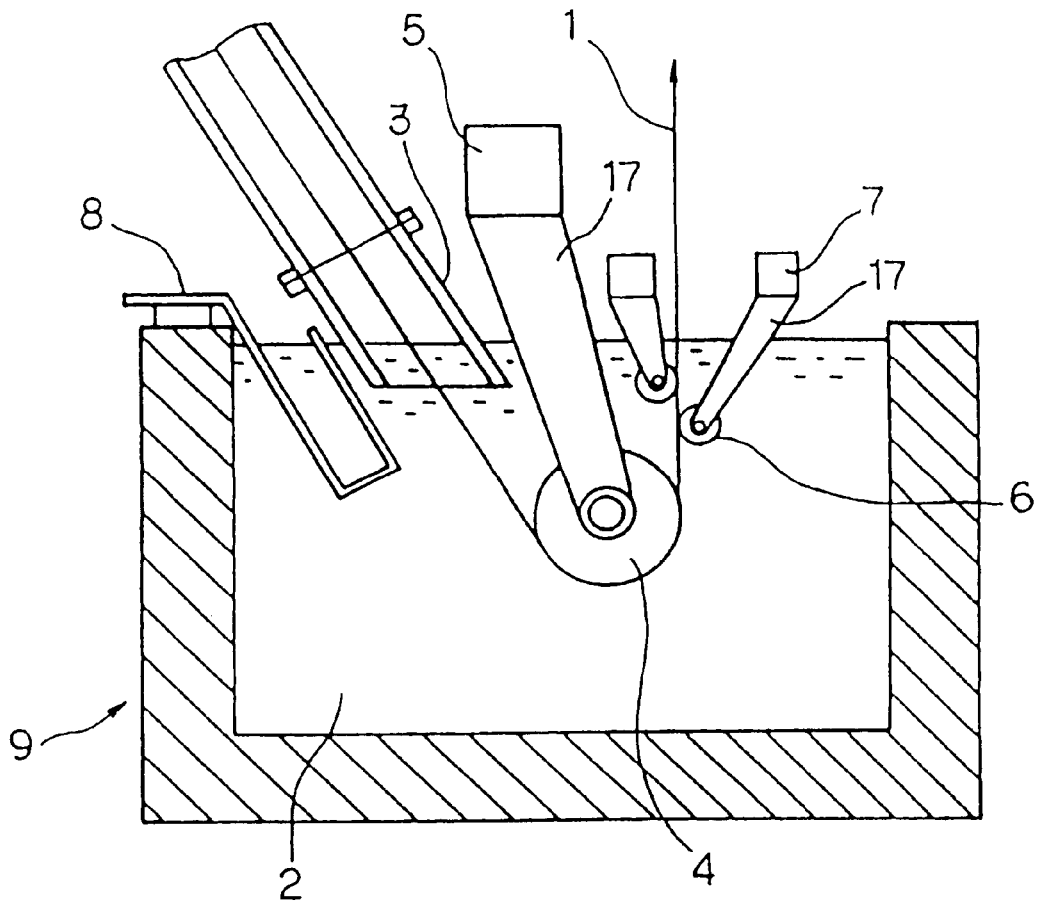
FIG. 1 is a cross-sectional view showing a molten metal plating device employing a roller in accordance with the present invention.
Figure 2A:
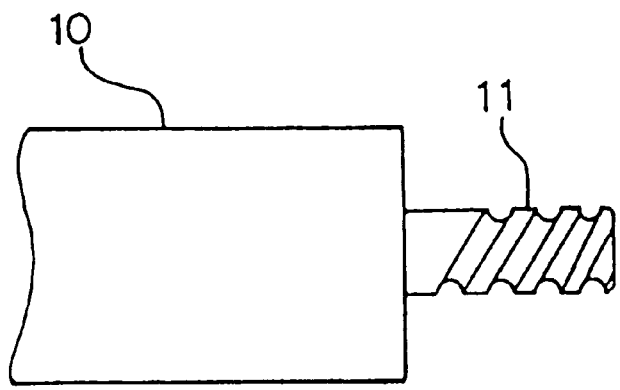
FIG. 2(a) is a side view showing an embodiment of a bearing for a support roller in accordance with the present invention.
Figure 2B:
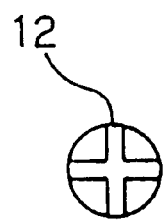
FIG. 2(b) shows a front end of an axle shown in FIG. 2(a).

| | Description of the References |
|---|---|
| 1 | plating steel plate |
| 2 | molten metal bath |
| 3 | snout |
| 4 | synch roller |
| 5 | synch roller holder |
| 6 | support roller |
| 7 | support roller holder |
| 8 | melting box |
| 9 | oven |
| 10 | support roller cylinder |
| 11 | axle provided with a screw-shaped groove |
| 12 | axle end surface groove |
| 13 | projecting axle end surface |
| 14 | bearing |
| 15 | synch roller |
| 16 | synch roller axle |
| 17 | synch roller arm |
| 18 | synch roller bearing |
| 19 | synch roller thrust lock |

BEST MODE FOR CARRYING OUT THE INVENTION

The structure and function of the present invention will now be explained.

The various types of equipments for use in molten metal plating baths having an increased service life in accordance with the present invention are formed using a composition having as a main component thereof silicon nitride, which is non-reactive with the molten metal, and which is easily worked, so that it may be industrially employed.

In order to compensate for the defects of silicon nitride, that it is deficient in shock resistance and in strength, it is commonly combined with metals; however, there are great differences in the thermal expansion coefficients of metal and ceramics, and so there has been little success in the use thereof for various types of equipment used in molten metal plating baths.

In the present invention, the formation is conducted using a solely ceramic composition having silicon nitride as the main ingredient thereof, and the design is such that sufficient shock resistance and strength are exhibited.

That is to say, in case a roller support axle and a roller bearing formed with a ceramic composition having silicon nitride as the chief component thereof come into contact and rub against one another and a sufficient service life can not be obtained, a spiral groove is provided on the surface of the roller support axle, and one or more grooves are supplied on the end surface of the support axle, and by means of these grooves, molten metal enters into the gap between the surface of the roller support axle and the inner surface of the bearing, and these do not directly come into contact, so that the molten metal serves as a lubricant.

Commonly, in rotating axle bearing which employs ceramics such as metal oxides, metal carbides, metal borides, metal fluorides and the like, the ceramics are used for balls or needles, and structures are known in which metal is used on the inner race or the outer race, or the opposite combination is employed.

There are chiefly two problems with the case described above. One of these is that although the parts formed from ceramics contribute to an increase in service life, the metal portions have the conventional short service life, and do not contribute to the increase in service life of the implements and equipments which is the object of this invention. Another drawback is that dross having an extremely high hardness, comprising an alloy of two or more metals, is in suspension in the molten metal plating bath, and this enters in between the balls or needles and the race, creating resistance and stopping the function of the bearing.

In order to avoid a stoppage in bearing function resulting from the entry of the dross, a sliding bearing has been proposed, and various such bearings have been tested or partially produced. Ceramics are affixed in some way to a portion of a bearing which is formed from metal, that is to say, to the portion of the bearing which is contact with the axle. A disadvantage in this case is in the same manner as above, and the metal portions are eroded, so that the ceramic base material is eliminated, and no overall increase in service life can be realized.

The present invention solves all the deficiencies mentioned above; herein, the bearing comprises a sliding bearing formed in a unitary manner from ceramics, and in the same way, in the case of the roller, the present invention makes it possible not merely to use ceramics at those portions which are in contact with the bearing and which experience extreme abrasion and those portions which are in contact with the steel plates and also experience extreme abrasion, but to use the unitary formation of the roller using ceramics. The equipment for use in molten metal plating baths of the present invention does not employ a combination of metal and ceramics, so that there is no cracking resulting from the tensile or compressive forces generated by differences in thermal expansion coefficients, and use over a long period of time is possible.

The reason for limiting the composition ranges of the ceramic component used to form the equipment for use in molten metal plating baths of the present invention will now be explained.

$Si_3N_4$: 70–95%

This compound is resistant to corrosion by nonferrous molten metals other than copper, and is also resistant to acidic and alkaline conditions. Sintering formation is made possible by adding small amounts of $Al_2O_3$, $Y_2O_3$, and the like. At amounts of less than 70%, the thermal resistance and resistance to corrosion are insufficient, while when the amount is in excess of 95%, sintering formation becomes impossible.

$Al_2O_3$: 2–10%  $Y_2O_3$: 1–10%

By adding both of these together, the sintering formation of $Si_3N_4$ which is the chief component becomes possible. At amounts less than the lower limit, sintering becomes insufficient, while at amounts greater than the upper limit, practical application becomes impossible as a result of the decline in thermal resistance and resistance to corrosion.

AlN: 1–10%

This compound has a high thermal conductivity and a high hardness, and serves to increase the strength. At amounts of less than 1%, these effects can not be realized, while at amounts of more than 10%, the brittleness increases, and shock resistance declines.

When substances or elements other than these four are included as unavoidable impurities, the effects of the present invention will be undisturbed if the total amount is less than 1%.

An embodiment of the present invention will now be discussed; however, the present invention is not limited to this embodiment.

Embodiment 1

Figure 3:
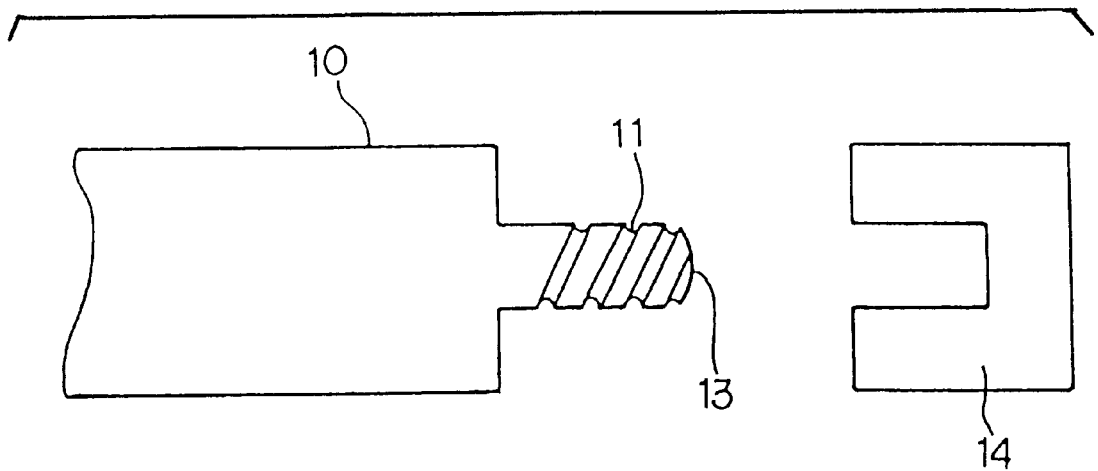
FIG. 3 is a side view showing another embodiment of a bearing for a support roller in accordance with the present invention and a cross-sectional view of this bearing.
Figure 4:
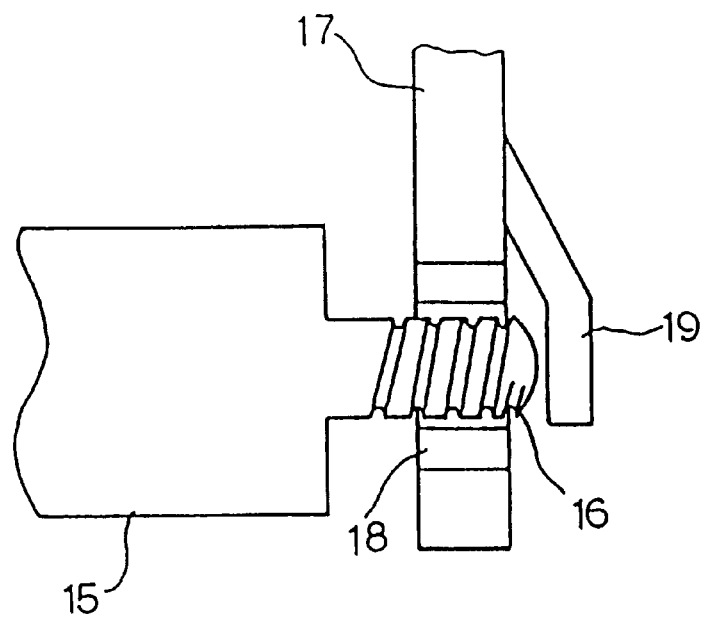
FIG. 4 shows a bearing combined with the synch roller bearing part of the present invention.

87% $Si_3N_4$, 3% AlN, 5% $Al_2O_3$, and 5% $Y_2O_3$ by weight were mixed in powdered form (having a grain size of 1.2 micrometers), 0.5 parts per weight of polyvinyl butyral were added as a binder to 100 parts per weight of the raw material powder, and this was agitated to produce a mixture. This mixture was then press-formed at a pressure of 1,000 kg/cm², and this was sintered for a period of 5 hours in a nitrogen atmosphere at a temperature of 1750° C., and the roller (having a diameter of 250 mm, a length of 1,900 mm, an axle diameter of 90 mm, an axle length of 150 mm, and an axle screw depth of 2 mm, and a pitch of 26 mm) and the bearing (having an inner diameter of 93 mm, an outer diameter of 140 mm, and a length of 120 mm) shown in FIG. 3 were obtained. The characteristics of the ceramic roller and bearing after sintering are as shown below.

| | |
|---|---|
| Flexural strength | 100 kg/mm² |
| Surface hardness HV | 1,580 |
| Resistance to corrosion (test solution: test piece test using a molten zinc bath) | Erosion loss: 1 mg/month or less |
| Resistance to abrasion (test conditions: an installed support roller bearing) | Amount of abrasion: 4 g/month or less |

The roller and bearing obtained in embodiment 1 were incorporated into the plating device of FIG. 1 (a molten zinc bath having a temperature of 470° C.), and this was operated continuously for a period of one month with respect to cold rolled steel plates (type of steel: low carbon aluminum killed steel, physical properties: Yp 28 kgf/mm², Ts 36 kgf/mm²) having an average width of 1,200 mm and an average thickness of 1.25 mm at an average pass through speed of 115 m/min, and after maintenance, the roller of the present invention was used six times under the same conditions, and no defects were produced in the surface of the roller.

For the purposes of comparison, hard chromium plating having a thickness of 30 micrometers was executed on a roller axle and bearing comprising SUS316L having the same size as that of embodiment 1, and this was subjected to plating operations under the same conditions. It was necessary to change the roller after a period of ten days from the initiation of operations because of the rough quality of the roller surface.

As described above, the equipment of the present invention exhibits an extremely long service life in the case of rollers, roller bearings, and thrust locks which are subjected to abrasion and rubbing; those portions which do not experience rubbing and abrasion, such as roller arms, melting boxes, and snouts have a semi-permanent service life. When conventional technologies are applied to such equipment, the surface life thereof is 2–3 years, with the exception of the oven.

Industrial Applicability

The present invention is structured as described above, so that the equipment for use in molten metal plating baths having an extremely long service life is obtained, and it is possible to greatly extend the period of continuous operation during which no equipment is replaced, and this is extremely useful in industry.

We claim:

1. An equipment for use in a molten metal plating bath, comprising a bearing disposed in the molten metal plating bath for supporting a roller with an end, said bearing containing 70–95 wt. % of $Si_3N_4$, 2–10 wt. % of $Al_2O_3$, 1–10 wt. % of AlN and 1–10 wt. % of $Y_2O_3$ and having a concave with a rectangular shape in section, said end of the roller being directly disposed in the concave to be supported by the bearing without using rollers.

2. An equipment for use in a molten metal plating bath, comprising a bearing disposed in the molten metal plating bath for supporting a roller with an end, said bearing containing 70–95 wt. % of $Si_3N_4$, 2–10 wt. % of $Al_2O_3$, 1–10 wt. % of AlN and 1–10 wt. % of $Y_2O_3$; and having a cylindrical shape with a hole, said end of the roller being directly disposed in the hole to be supported by the bearing without using rollers.

3. An equipment according to claim 2, further comprising a synch roller arm, to which said bearing is attached.

4. An equipment according to claim 3, further comprising a synch roller thrust lock attached to the synch roller arm and disposed near the bearing.

* * * * *